(12) United States Patent
Graber

(10) Patent No.: US 6,223,907 B1
(45) Date of Patent: May 1, 2001

(54) THEFT-RESISTANT BICYCLE RACK

(75) Inventor: Thomas L. Graber, Madison, WI (US)

(73) Assignee: Trilary, Inc., Middleton, WI (US)

( * ) Notice: Subject to any disclaimer, the term of this patent is extended or adjusted under 35 U.S.C. 154(b) by 0 days.

(21) Appl. No.: 09/396,577

(22) Filed: Sep. 15, 1999

(51) Int. Cl.$^7$ .................................................. E05B 73/00
(52) U.S. Cl. .................................. 211/5; 211/17; 70/62; 70/233
(58) Field of Search ........................ 211/4–5, 17, 20–22; 70/58, 62, 233–236; D12/115; 248/49; 72/367.1, 369; 29/445, 455.1, 234; 138/108, 113–114, 177–178

(56) References Cited

U.S. PATENT DOCUMENTS

| | | | |
|---|---|---|---|
| D. 301,217 | * 5/1989 | Mailhot et al. ................... D12/115 |
| D. 367,022 | 2/1996 | Graber . | |
| D. 408,763 | 4/1999 | Graber . | |
| D. 408,764 | 4/1999 | Graber . | |
| D. 409,118 | 5/1999 | Graber . | |
| 1,252,135 | * 1/1918 | Meiselbach ............................ 70/233 |
| 1,688,496 | * 10/1928 | Holtzman ............................... 70/233 |
| 2,107,737 | * 2/1938 | Irwin ...................................... 70/233 |
| 3,724,844 | * 4/1973 | Olmstead et al. ..................... 211/22 |
| 3,756,048 | * 9/1973 | Portus ................................... 70/233 |
| 3,762,569 | * 10/1973 | Spring ...................................... 211/5 |
| 4,064,714 | * 12/1977 | Treslo .................................... 70/58 |
| 4,182,454 | * 1/1980 | Tohms ....................................... 211/5 |
| 4,306,660 | * 12/1981 | Livingston ............................ 211/20 |
| 4,353,521 | * 10/1982 | Webb ..................................... 70/58 |
| 4,432,123 | * 2/1984 | Minning et al. .................... 29/455.1 |
| 4,465,198 | * 8/1984 | Martin ................................ 211/105.3 |
| 4,524,893 | * 6/1985 | Cole ........................................ 211/5 |
| 5,098,155 | 3/1992 | Graber . | |
| 5,417,629 | * 5/1995 | Phipps .................................. 211/22 |
| 5,438,854 | * 8/1995 | Seraj .................................... 70/233 |
| 5,640,861 | * 6/1997 | Chen ..................................... 70/53 |
| 5,706,679 | * 1/1998 | Zane et al. ............................. 70/58 |
| 5,967,077 | * 10/1999 | Shapiro ................................ 114/343 |

\* cited by examiner

Primary Examiner—Daniel P. Stodola
Assistant Examiner—Jennifer E. Novosad
(74) Attorney, Agent, or Firm—Lathrop & Clark LLP

(57) ABSTRACT

A bicycle rack has a bent outer pipe with a nonaligned, smaller diameter, inner pipe received within the outer pipe. Both ends of the outer pipe are connected to bases which are affixed to the ground or pavement. A slack metal chain extends within the inner pipe. The walls of the two pipes are offset from one another making compromising of the rack with a pipe cutter difficult. The slack chain conflicts with the reciprocating blade of a power tool making severing of the rack at any point difficult.

13 Claims, 1 Drawing Sheet

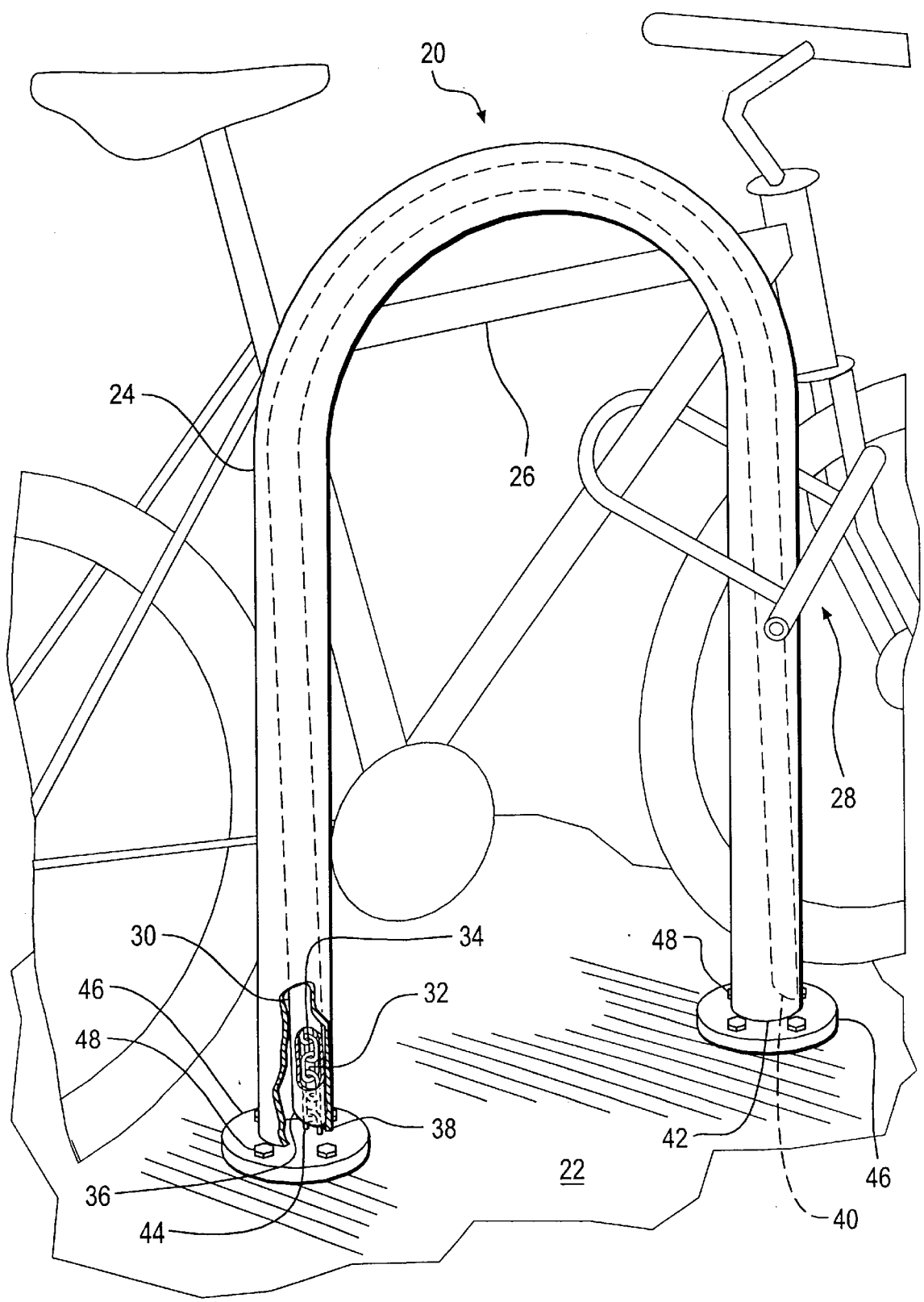

THEFT-RESISTANT BICYCLE RACK

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

This invention relates generally to fixed racks for bicycle parking, and more particularly to bicycle racks having anti-vandalism and anti-theft features.

Several trends have contributed to the use of bicycles for personal transportation in metropolitan areas. First, increased congestion on heavily traveled roadways may slow travel through cities during working hours. The bicyclist can circumvent crowded highways and main thoroughfares by taking trails and bicycle paths which are closed to motor vehicle traffic. Second, higher density working conditions often result in an increase in working population disproportionate to the available number of automobile parking spaces. The same area of pavement which receives one car can accommodate dozens of bicycles. Third, advancements in bicycle engineering and design have made bicycle commuting more satisfying, and has encouraged recreational bike riding as a family activity.

City planners, eager to encourage the substitution of bicycle traffic for motor vehicle traffic, have aided the growth in bicycle usage by building and refurbishing bicycle paths, and by providing conveniently located bicycle parking structures. However, the popularity of bicycle riding among a diverse population, as well as the advent of higher performance and higher cost bicycles, have made bicycles an appealing target for theft. The decades-long battle between bicyclists and bicycle thieves has seen an escalation in the tools of theft prevention and the tools of theft.

The bicycle thief attacks the weakest link of the connection between the bicycle and the bicycle rack. At one time a light gauge chain passed through the front wheel of the bicycle and secured with a simple combination lock was considered adequate. This precaution, however, was readily circumvented by an inexpensive bolt cutter. Heavy-duty steel bar locks, such as the popular Kryptonite® bicycle U-lock, manufactured by Kryptonite Corporation, www.kryptonitelock.com, employing rugged steel members and difficult-to-pick locks, have made the connection between the bicycle and the rack a fairly secure one. Undaunted, thieves redirected their efforts to compromising the structure of the rack itself. Small diameter rods and wires in bicycle racks are easy victims to the bolt cutter. Rack designers responded with heavy galvanized steel tube racks two inches in diameter or greater, such as the racks shown in my U.S. Pat. Nos. 5,098,155; U.S. Pat. No. Des. 409,118; U.S. Pat. No. Des. 408,764; U.S. Pat. No. Des. 408,763; and U.S. Pat. No. Des. 367,022; the disclosures of which are incorporated by reference herein.

However, even these heavy steel tubes are made easy work of by a low-cost conventional pipe cutter. The modem urban bicycle thief approaches the serpentine tube rack with a readily concealed pipe cutter, which he uses to sever the steel pipe of the rack from its connection to the ground, working rapidly and silently. Once severed, the two sections of pipe are displaced and the bicycle or bicycles, with locks still intact, are loaded onto a waiting truck or van. Once out of public view, the locks may be removed with specialized picks or power saws.

To combat the thief armed with a pipe cutter, racks have been fabricated of square steel tubing which is not susceptible to the rotary pipe cutter. Not only are square steel tubing racks more costly to fabricate, but even this design gambit is not proof against the determined bicycle thief. Advances in compact tool design and energy-dense batteries have resulted in lightweight and portable hand tools with the power once restricted to tools requiring nearby electrical outlets. Especially useful in attacking a square tubular bicycle rack is the portable reciprocating saw, for example of the type manufactured by Milwaukee Electric Tool Corp. under the trademark SAWZALL®. These reciprocating saws, with a 3 to 9 in. long blade, can make short work of a 2½ in. bicycle rack square tube.

What is needed is a convenient bicycle rack which resists assaults by thieves armed with pipe cutters and reciprocating saws.

SUMMARY OF THE INVENTION

A bicycle rack has a bent outer pipe with a nonaligned, smaller diameter, inner pipe received within the outer pipe. Both ends of both pipes are connected to bases which are affixed to the ground or pavement. A slack metal chain extends within the inner pipe. The walls of the two pipes are offset from one another making compromising of the rack with a pipe cutter difficult. The slack chain conflicts with the reciprocating blade of a power tool making severing of the rack at any point difficult.

It is an object of the present invention to provide a bicycle rack which is not readily severed by a pipe cutter.

It is also an object of the present invention to provide a bicycle rack which is resistant to cutting by a reciprocating saw.

It is another object of the present invention to provide a theft resistant bicycle rack which is identical in outward appearance to a conventional bicycle rack.

It is a further object of the present invention to provide a theft resistant bicycle rack which may be fabricated in a wide range of appearances.

Further objects, features and advantages of the invention will be apparent from the following detailed description when taken in conjunction with the accompanying drawings.

BRIEF DESCRIPTION OF THE DRAWINGS

The FIGURE is a perspective view, partially broken away in section, of the theft-resistant bicycle rack of this invention.

DESCRIPTION OF THE PREFERRED EMBODIMENTS

Referring more particularly to the figure, wherein like numbers refer to similar parts, a theft-resistant bicycle rack 20 is securely fastened to the ground or paving 22. The rack 20 has an outward appearance which is indistinguishable from a conventional curved tubing bicycle rack. However, concealed within the conventional exterior is an interior structure designed to frustrate attempts at circumventing the bicycle security functions of the rack.

The rack 20 has an outer pipe 24 which is formed in a conventional pipe bending machine into a curved configuration adapted to provide attachment points for a bicycle 26 and connecting bicycle lock 28. The outer pipe 24 may have a square cross-section, or, as shown in the figure, a circular cross-section of about 2⅜ inches in diameter. An inner pipe 30 extends within the outer pipe 24 and is preferably fastened to the outer pipe. A chain 32 extends within the inner pipe 30. The inner pipe 30 is of generally circular cross-section and may be about 1⅝ in. in diameter. The chain 32 is comprised of multiple interlocking links 34. The links 34 are formed of steel, preferably case hardened steel alloy. Each link 34 is formed of steel round or square rod approximately ¼ to 5/16 in. in diameter. The links 34 may be from about three-quarter in. to two inches long. The chain 32 has a length when subjected to tension which is greater than the length of the centerline of the shaped inner pipe 30. In other words, the chain 32 as disposed within the inner pipe 30 is slack.

The rack 20 is fabricated by first inserting the inner pipe 30 within the outer pipe 24 when both pipes are unbent straight tubes. A first end 36 of the inner pipe 30 is tack welded to a first end 38 of the outer pipe 24 on one side of a centerline running through the outer pipe, while a second end 40 of the inner pipe 30 is tack welded to a second end 42 of the outer pipe which is on the opposite side across the centerline from the connection between the first ends 36, 38. The inner pipe 30, it will be noted, is thus inclined with respect to the outer pipe 24, with the result that the centerline of the inner pipe 30 is not colinear with the centerline of the outer pipe. The chain 32 is disposed within the inner pipe 30, and, because the chain 32 is longer than the inner pipe, the ends 44 of the chain will protrude from the inner pipe. The assembly of the outer pipe 24, inner pipe 30, and chain 32 is then bent on the bending machine to the desired shape.

The chain 32 is secured within the rack 20 by welding each end 44 of the chain to a steel disk 46 which serves as a base for each end of the rack. Each end 38, 42 of the outer pipe 24 is welded to one of the disks 46. The inner pipe ends 36, 40 may also be welded to the disks 46. Each disk 46 has a plurality of holes through which bolt fasteners 48 extend into the paving 22.

Because the inner pipe 30 is not coaxial with the outer pipe 24, at any point along the rack 20, it is particularly difficult for both pipes to be cut with a pipe cutter, because one exterior wall portion of the inner pipe will be significantly spaced from the interior wall of the outer pipe.

However, even if a determined thief is able to compromise both pipe walls, for example by the use of a portable reciprocating saw, the slack chain 32 disposed within the inner pipe 30 will be an obstacle to severing completely the rack, thereby preventing removal of any attached bicycles. Rapidly moving reciprocating saws operate effectively only on fixed elements. The slack chain 32 when struck by the moving blade will recoil and vibrate furiously. Not only will this vibration make holding the power tool extremely uncomfortable, it will very likely result in the breaking of the blade. It should be noted that, as bicycle racks are typically positioned in public spaces, speed is of key importance to the successful bicycle thief. Any delay or complication increases the likelihood of apprehension. This is especially the case should the thief endeavor a daylight attack on the bicycle rack—when the selection of desirable bicycles is at its peak.

For corrosion resistance, the inner pipe may be pre-galvanized, and the chain may be zinc-coated.

It should be noted that although a base for the rack 20 has been shown as circular disks, in in-ground installations, both the outer pipe and the inner pipe may be extended downwardly into the ground or a concrete foundation. These downwardly extending portions than serve as a base at each end of the rack. In such a configuration the chain may be fastened at its free ends 44 to the inner pipe ends. Although welding of the chain to the base has been disclosed, other means of connecting the slack chain to the pipes or disks may be employed, for example a pin connection.

It should be noted also, that although a rack having only a single loop has been illustrated, bent tubular racks of many different configurations employing the security features of this invention may also be fabricated. If desired, multiple lengths of chain may be disposed within different sections of a larger rack.

A particularly advantageous property of the rack 20 is that to outward appearances it is identical to a conventional tubular steel rack. Hence, a municipality or institution having a number of installed bicycle racks need not replace all the racks at once to begin to realize some of the benefits of increased security provided by the rack of this invention. An industrious bicycle thief will find his chances of successfully compromising any particular rack falling in proportion to the fraction of racks of this invention installed. This frustration may encourage the thief to direct his efforts elsewhere.

Although attaching the inner pipe across the interior of the outer pipe is an economical approach from a fabrication standpoint which ensures that the inner pipe is spaced from the walls of the outer pipe at locations other than the base of the pipes, other assemblies may also be effective. For example, the inner pipe may extend substantially co-axially within the outer pipe by being welded to the base disks at each end of the rack. Such an attachment may be achieved by forming the base disks as circular annuluses. The exterior perimeter of each annulus is welded to the outer pipe, while the inner pipe protrudes through the center of the annulus and is welded thereto. The key functionality of the pipe placement is to maintain the inner pipe spaced from the outer pipe applications other than the base. The arrangement shown in the figure is one effective configuration having minimal contact between the inner pipe and the outer pipe.

It is understood that the invention is not limited to the particular construction and arrangement of parts herein illustrated and described, but embraces such modified forms thereof as come within the scope of the following claims.

I claim:

1. A bicycle rack comprising:
   an outer pipe fixed to a base;
   an inner pipe extending within the outer pipe; and
   a chain comprised of a plurality of connected links, the chain being fixed to the inner pipe within the inner pipe such that the chain does not extend beyond the outer pipe and the inner pipe, the chain being positioned to engage and interfere with the intrusion of a cutting blade through the outer pipe and the inner pipe.

2. The bicycle rack of claim 1 wherein the outer pipe is generally cylindrical.

3. The bicycle rack of claim 1 wherein the inner pipe has a centerline which extends from a first end of the inner pipe to a second end of the inner pipe, and wherein the chain has a first length when subjected to tension, the chain first length being greater than the length of the inner pipe centerline, such that the chain is generally slack as it extends within the inner pipe.

4. The bicycle rack of claim 1 wherein a gap is defined between portions of the outer pipe and the inner pipe such that a pipe cutter severing the outer pipe is restricted from ready engagement of the inner pipe at the location of the severing.

5. A bicycle rack comprising:
   an outer pipe fixed to a base;

an inner pipe extending within the outer pipe; and a chain comprised of a plurality of connected links the chain being fixed within the inner pipe, the chain being positioned to engage and interfere with the intrusion of a cutting blade through the outer pipe and the inner pipe, wherein the outer pipe has a first end fixed to a first base, and a second end fixed to a second base, and wherein the inner pipe has a first end which is fixed to the outer pipe first end and a second end which is fixed to the outer pipe second end.

6. A bicycle rack comprising:

an outer pipe fixed to a base;

an inner pipe extending within the outer pipe; and a chain comprised of a plurality of connected links, the chain being fixed within the inner pipe such that the chain does not extend beyond the outer pipe and the inner pipe, the chain being positioned to engage and interfere with the intrusion of a cutting blade through the outer pipe and the inner pipe, wherein one of the chain links is fixed to the base.

7. A bicycle rack comprising:

an outer pipe fixed to a base;

an inner pipe extending within the outer pipe; and a chain comprised of a plurality of connected links, the chain being fixed within the inner pipe, the chain being positioned to engage and interfere with the intrusion of a cutting blade through the outer pipe and the inner pipe, wherein the outer pipe has a centerline which is not co-linear with the inner pipe centerline.

8. A bicycle rack comprising:

a bent outer pipe having a first end disposed adjacent a ground surface, and a second end disposed adjacent the ground surface, the outer pipe having a first center line which extends along the center of the outer pipe;

a first base connected to the first end of the outer pipe and fastened to the ground surface;

a second base connected to the second end of the outer pipe and fastened to the ground surface;

a bent inner pipe extending within the outer pipe and having a first end which is fixed to the outer pipe adjacent the outer pipe first end, and a second end which is fixed to the outer pipe adjacent the outer pipe second end, the inner pipe having a second center line which extends along the center of the inner pipe, the inner pipe interfering with the ready severing of the pipes of the rack by a pipe cutter; and a chain extending within the inner pipe.

9. The bicycle rack of claim 8 wherein the outer pipe is generally cylindrical.

10. The bicycle rack of claim 8 wherein the chain has a first length when subjected to tension, the chain first length being greater than the length of the inner pipe centerline, such that the chain is generally slack as it extends within the inner pipe.

11. The bicycle rack of claim 8 wherein a gap is defined between portions of the outer pipe and the inner pipe such that a pipe cutter severing the outer pipe is restricted from ready engagement of the inner pipe at the location of the severing.

12. A bicycle rack comprising:

a bent outer pipe having a first end disposed adjacent a ground surface, and a second end disposed adjacent the ground surface, the outer pipe having a first center line which extends along the center of the outer pipe;

a first base connected to the first end of the outer pipe and fastened to the ground surface;

a second base connected to the second end of the outer pipe and fastened to the ground surface; and a bent inner pipe extending within the outer pipe and having a first end which is fixed to the outer pipe adjacent the outer pipe first end, and a second end which is fixed to the outer pipe adjacent the outer pipe second end, the inner pipe having a second center line which extends along the center of the inner pipe, the inner pipe interfering with the ready severing of the pipes of the rack by a pipe cutter, wherein the outer pipe first centerline is not co-linear with the inner pipe second centerline.

13. A bicycle rack comprising:

an outer bent pipe defining a centerline;

an inner bent pipe extending within the outer pipe, the inner pipe having a centerline which is not colinear with the outer pipe centerline; and a chain extending within the inner pipe, the chain being positioned to engage and interfere with the intrusion of a cutting blade through the outer pipe and the inner pipe, the chain having a first length when subjected to tension, the chain first length being greater than the length of the inner pipe centerline, such that the chain is generally slack as it extends within the inner pipe.

* * * * *